Jan. 22, 1935.　　　　E. G. BUSSE ET AL　　　　1,988,831
BRAKE HEAD
Filed June 1, 1931　　　3 Sheets-Sheet 1
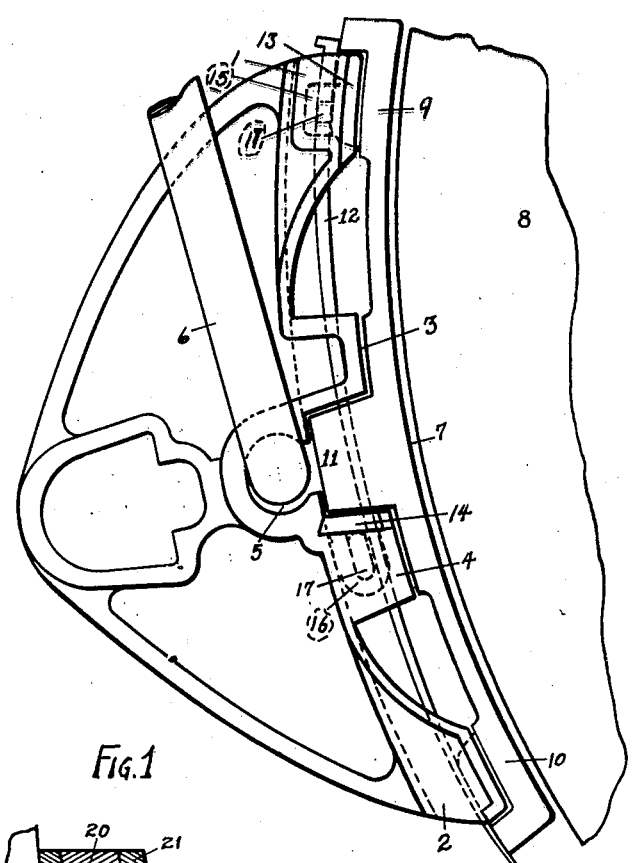
Fig.1
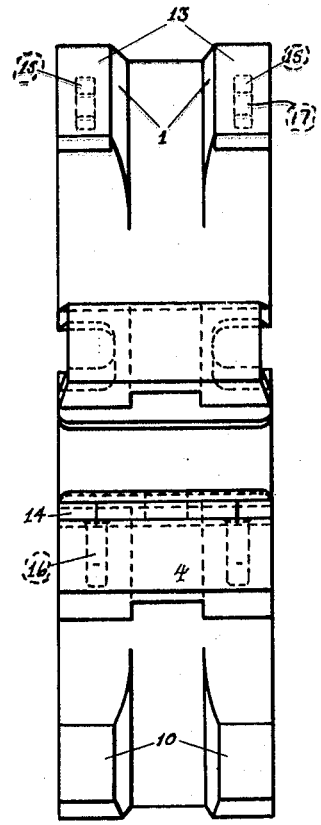
Fig. 2
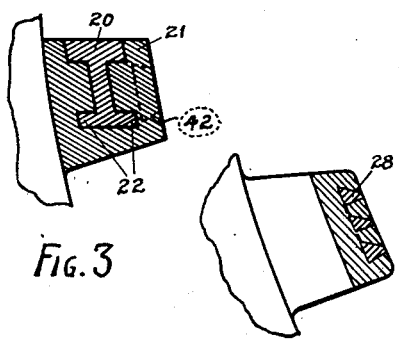
Fig. 3　　Fig. 7　　Fig. 6　　Fig. 5　　Fig. 4
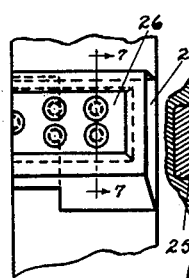
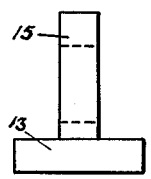
Fig. 1a
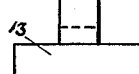
Fig. 2a
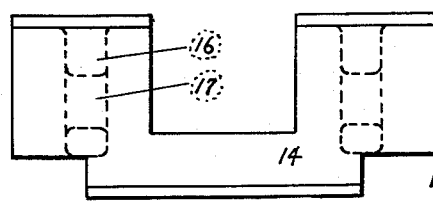
INVENTORS
Edwin G. Busse
Euclid E. Griest
BY Rodney Bedell
ATTORNEY Jan. 22, 1935. E. G. BUSSE ET AL 1,988,831
BRAKE HEAD
Filed June 1, 1931  3 Sheets-Sheet 2

INVENTORS
Edwin G. Busse
Euclid E. Griest
BY Rodney Bedell
ATTORNEY.

Jan. 22, 1935.  E. G. BUSSE ET AL  1,988,831
BRAKE HEAD
Filed June 1, 1931  3 Sheets-Sheet 3

INVENTORS
Edwin G Busse
Euclid E Griest
BY
ATTORNEY

Patented Jan. 22, 1935

1,988,831

UNITED STATES PATENT OFFICE 1,988,831

BRAKE HEAD

Edwin G. Busse and Euclid E. Griest, Chicago, Ill., assignors to Chicago Railway Equipment Company, Chicago, Ill., a corporation of Illinois Application June 1, 1931, Serial No. 541,442

10 Claims. (Cl. 188—236)

The invention relates to railway rolling stock brake structure and consists in the manufacture of a brake head of relatively soft metal having inserts of relatively hard metal at points where the head is subjected to excessive wear, whereby the useful life of the head is prolonged.

The main object of the invention is to reduce maintenance expense not only by prolonging the life of the head, as indicated, but also by maintaining the brake shoe in its proper position relative to the wheel thereby avoiding excessive wear on the shoe because of dragging of the shoe on the wheel.

In the accompanying drawings which illustrate the invention—

Figure 1 is a side view of a brake head, shoe, and key, the adjacent portion of the wheel and brake hanger being indicated also.

Figure 2 is a front view of the brake head.

Figure 1a is a detail of one of the hardened steel inserts shown in Figures 1 and 2.

Figure 2a is a detail of another of the hardened steel inserts shown in Figures 1 and 2.

Figure 3 is a section through a brake head center lug and insert showing another form of insert.

Figures 4 and 5 are a front view and a vertical section, respectively, showing another form of insert and the adjacent portion of the toe, Figure 5 being taken on line 5—5 of Figure 4.

Figures 6 and 7 are a similar front view and a vertical section, respectively, showing another modification, Figure 7 being taken on line 7—7 of Figure 6.

Figure 8:
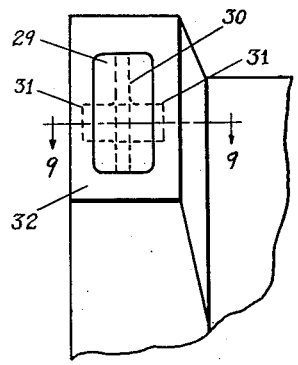
Figures 8 and 9 are a front view and a horizontal section, respectively, illustrating another modification, Figure 9 being taken on line 9—9 of Figure 8.

Figures 1 and 2 illustrate a brake head corresponding generally to the usual structure in having top and bottom toes 1 and 2 and intermediate center lugs 3 and 4 at each side of the recess 5 for receiving the usual hanger 6. The shoe 7, which contacts with the wheel when the brakes are set and is renewed from time to time as it wears down, has the usual top and bottom lugs 9 and 10 protruding to fit between the top and bottom toes of the head and has the usual center lug 11 positioned between the center lugs 3 and 4 of the head. The shoe may be supported by the engagement of its center lug with the lower center lug of the head and the engagement between the top and bottom head toes and shoe lugs provides for distribution of the braking force throughout the length of the shoe. The shoe is held in assembled relation with the head by means of a key 12 which passes through openings in the head toes and shoe center lug in the usual manner.

Theoretically, the shoes will swing free of the wheels except when the brakes are applied. In practice, however, it is common for the top of a shoe to drag on the wheel which loosens up the holding key and results in a continuous pounding or other movement between the shoe and head and particularly between shoe center lug 11 and head supporting lug 4 and between upper shoe lug 9 and its backing head toe 1. The brake head is usually formed of malleable iron casting or of cast steel and is of softer metal than the grey iron shoe and the relative movement referred to tends to wear down the toes 4 and 9 to such an extent that the brake head must frequently be replaced solely because of such wear.

To avoid this condition, we have provided hard steel inserts 13 and 14 in toe 1 and lug 4, respectively, these inserts being formed previous to the casting of the head and placed in the head mold with their shoe contacting faces against the wall of the mold. The metal of the body of the head is then poured into the mold and around the insert. Each insert comprises a wide working portion, forming a shoe contacting face for the head, and an extension 15 and 16, respectively, of smaller section projecting inwardly from the working portion and provided with a recessed portion into and around which the metal of the head may flow to retain the insert against removal. These extensions are in the form of ears having central openings 17 extending transversely therethrough and parallel with the faces of the inserts.

Inserts 13, like toes 1, are separate from each other in order to receive the shoe lug between them. The working portion of insert 14 on head lug 4 extends across the width of the head and shoe and the extensions 16 are spaced apart and are of relatively small section as compared with the working portion of the insert.

The inserts are preferably made of manganese steel having a 5% manganese content and preferably the insert is coated with a tin flux to facilitate fusing of the insert with the metal of the body of the head. This coating tends to eliminate the production of gas and resulting blow holes. We have found that such inserts may be successfully embedded in the molten iron of the head and will withstand the annealing temperatures of around 1500 or 1600 degrees Fahrenheit by which the head is softened and toughened. A Brinell test after annealing the head shows that the insert has a hardness of 477 against 95 from the malleable iron body of the head.

Figure 3 illustrates a modification of the shoe supporting lug in which two separate inserts are embedded in the lug. One of these inserts is of I-section in which the working portion 20 covers only a part of the upper face of the lug 21 and its flanges 22 form lateral projections for engagement by the retaining lips of the body of the lug. Another front insert 42 is simply a truncated pyramidal block with its laterally projecting walls embedded in the body of the lug.

In Figures 4 and 5, the working portion of the insert 23 is similarly of less area than the face of the lug 24 and the retaining extension 25 is at the lower portion of the insert.

In Figures 6 and 7, the insert 26 is also of less area than the face of the lug 27 and the retaining extensions comprise conical elements 28 surrounded by the metal of the body of the lug.

Figure 9:
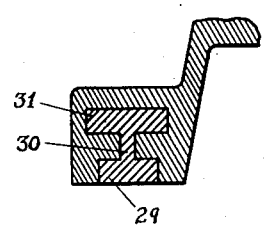

Figures 8 and 9 illustrate an insert 29 with a rearwardly extending web 30 running the full length of the insert and having lateral flanges 31 at its inner edge for engagement by the metal of the body of lug 32.

Figure 10:
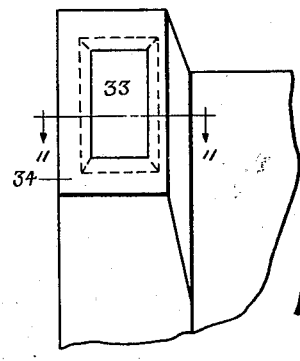
Figures 10 and 11 are a similar view and a section, respectively, illustrating another modification, Figure 11 being taken on line 11—11 of Figure 10.
Figure 11:
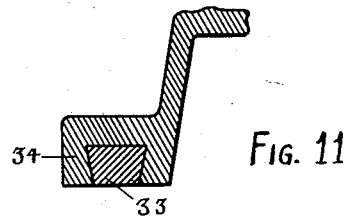

Figures 10 and 11 illustrate a top insert 33 in the form of a truncated pyramidal block with its base being embedded in the body of the lug 34.

Figure 12:
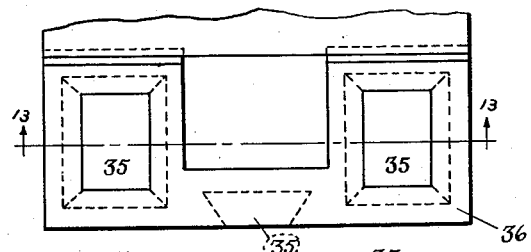
Figures 12 and 13 are a similar view and a section, respectively, illustrating another modification, Figure 13 being taken on line 13—13 of Figure 12.
Figure 13:
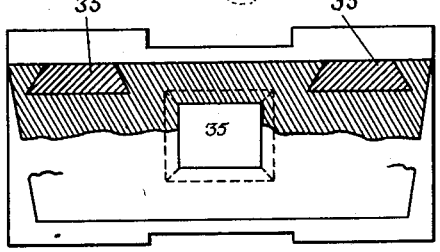

Figures 12 and 13 illustrate similar inserts 35 applied to the shoe supporting lug 36 and having no connection with each other.

Figure 14:
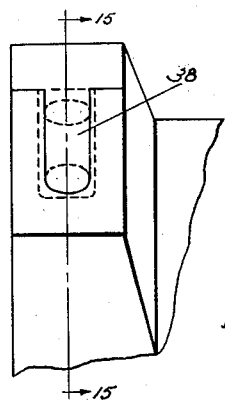
Figures 14 and 15 are a similar view and section, respectively, illustrating another modification, Figure 15 being taken on line 15—15 of Figure 14.
Figure 15:
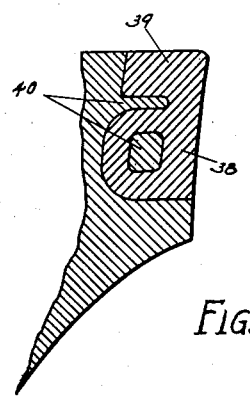

In Figures 14 and 15, the insert 38 has an upper lip 39 and the portions of the body of the head indicated at 40 form spaced retaining elements for the insert.

Figure 17:
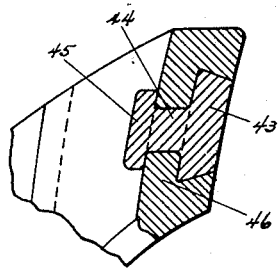
Figures 16 and 17 are a similar view and section, respectively, illustrating another modification, Figure 17 being taken on line 17—17 of Figure 16.
Figure 16:
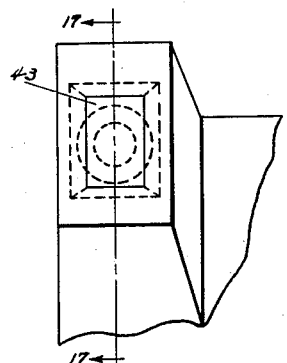

In Figures 16 and 17, the insert has a shoe contacting portion 43 at the outer end of a shank 44 and a lateral projection 45 on the other end of the shank may be embedded in the corresponding wall of the mold so that the metal 46 of the body of the head may flow around the shank between portions 43 and 45 to secure the insert in position.

All forms of the invention described embody the essential feature of a hard metal bearing for mounting the shoe on the head to avoid undue wear of the soft metal head due to pounding or other movement of the shoe thereon. In the preferred forms of the invention, the major portion of the face of the brake head shoe-engaging lugs and toes are formed by relatively thin contact elements of harder steel held in place by retaining extensions or projections of relatively small extent whereby the body of the shoe and toes may be cast around a portion of the insert with the minimum application of heat to the insert due to the face of the latter being in contact with the surface of the mold.

We are aware that it has been proposed to form the entire brake head of manganese and other alloy steels but such heads are substantially more expensive than malleable iron or cast steel heads and because of their brittle quality are more subject to breakage. Hence they are less desirable than the malleable iron or cast steel heads except for the wear resisting quality which is retained in our shoe at substantially less expense and without foregoing the advantages of the ordinary malleable heads.

The percentage of manganese in the inserts may differ from that mentioned herein up to 12 or 15 percent and the inserts could be formed of material other than manganese steel such as high carbon steel and other alloys, for examples, chrome nickel, vanadium, tungsten, chrome vanadium, chrome-molybdenum, all of which will retain their hardness even after the body of the head has been annealed. We find, for instance, that a 150% carbon steel will have a scleroscope scale of 22, annealed vanadium steel, 35 to 45, chrome nickel steel, 47. It is true that these alloy steels are usually used in connection with a special heat treating and annealing process. Nevertheless, inserts of these various alloys are considerably higher in their annealed state without the special hardening process than is malleable iron or cast steel, out of which the average brake head body is preferably made. However, we have found the percentage named to be satisfactory and we believe the manganese steel insert will be serviceable and economical. If desired, all of the lugs could include the harder inserts although usually this will not be necessary. Other modifications of the composition and form of the insert and other details of the invention may be made without departing from the spirit of our invention and we contemplate the exclusive use of those devices which come within the spirit of our claims.

What is claimed is:

1. In a railway brake head having lugs and toes for engaging and mounting the brake shoe, spaced inserts of metal harder than the body of the lugs and toes disposed so as to contact with spaced parts of the shoe to prevent wear due to movement between the shoe and the lugs and toes, the metal of the body of the lugs and toes being cast about the inserts and forming a shoe engaging face at the sides of said inserts.

2. In a railway brake head of relatively soft metal having two pair of spaced shoe mounting toes located at the top and bottom of the head and having center lugs above and below the hanger recess, a relatively hard metal insert forming a relatively small part only of the front face of the top toe to contact with the rear face of the brake shoe and another relatively hard metal insert forming a relatively small part only of the upper face of the center lug below the hanger recess for contact with the lower face of the intermediate lug of the shoe whereby undue wear of the head toes and lug at these two points is avoided and the position of the shoe relative to the wheel is maintained, the ratio between the mass of each of the toes to its individual insert being so great that the toe body cast metal may crystallize in solidifying without being sufficiently chilled by its insert to substantially affect the toughness of the toe cast metal about the insert.

3. In a railway brake head of relatively soft metal having shoe mounting toes and lugs, relatively hard metal inserts forming relatively small parts only of the shoe contacting faces of the toes and lugs whereby undue wear of the head, toes and lugs at the shoe engaging points is avoided and the position of the shoe relative to the wheel is maintained, the ratio of said inserts to said toes being so small that the head structure which supports the shoe is not weakened substantially.

4. In a railway brake head, a body of relatively soft metal having a portion disposed to engage and relatively locate a brake part associated with the head, and an insert of relatively small size and of more durable material imbedded in said portion to contact with said part, the relatively soft metal of said portion being cast about said insert and forming a face for engaging said part at the side of said insert.

5. A brake head as specified in claim 1 in which the insert has a deeply recessed portion spaced from its shoe contacting face and receiving the metal of the body of the head to hold the insert therein.

6. A brake head as specified in claim 1 in which the insert has a portion extending rearwardly from its shoe contacting face and provided with a transverse aperture filled with the metal of the body of the head to retain the insert in position.

7. In a railway brake head, a lug for mounting the brake shoe, an insert of metal harder than the body of the lug metal disposed to contact with a part of the shoe to prevent wear of said lug due to relative movement or pounding of the shoe, said insert having a deeply recessed portion spaced from its shoe contacting face and receiving the metal of the lug body to more securely hold the insert in position.

8. In a railway brake head, a lug for mounting the brake shoe, an insert of metal harder than the body of the lug metal disposed to contact with a part of the shoe to prevent wear of said lug due to relative movement or pounding of the shoe, said insert having a portion extending rearwardly from its shoe contacting face and provided with a transverse aperture filled with the metal of the lug body to more securely hold the insert in position.

9. A railway brake head having lugs and toes for mounting the brake shoe, the bodies of said lugs and toes being of cast iron and annealed, there being spaced inserts of manganese steel in at least one of said lugs and toes, said body metal being cast about the inserts and forming a shoe engaging face at the sides of said inserts.

10. In a railway brake head, a lug of annealed cast iron for mounting the brake shoe, an insert of manganese steel located in said lug to contact with a part of the shoe to prevent wear of said lug due to relative movement or pounding of said shoe, said insert having a deeply recessed portion spaced from its shoe contacting face and receiving the metal of the lug body to more securely hold the insert in position.

EDWIN G. BUSSE.
EUCLID E. GRIEST.